(12) United States Patent
Canann

(10) Patent No.: US 7,966,393 B2
(45) Date of Patent: Jun. 21, 2011

(54) SYSTEM AND METHOD FOR MEDIA STREAM MONITORING

(75) Inventor: Michael Canann, Cold Spring, KY (US)

(73) Assignee: Clear Channel Management Services, Inc., San Antonio, TX (US)

( * ) Notice: Subject to any disclaimer, the term of this patent is extended or adjusted under 35 U.S.C. 154(b) by 200 days.

(21) Appl. No.: 12/242,072

(22) Filed: Sep. 30, 2008

(65) Prior Publication Data

US 2009/0210550 A1 Aug. 20, 2009

Related U.S. Application Data

(60) Provisional application No. 61/029,541, filed on Feb. 18, 2008.

(51) Int. Cl.
*G06F 15/173* (2006.01)

(52) U.S. Cl. ........ 709/223; 709/217; 709/218; 709/219; 709/224; 709/230; 709/232; 709/247

(58) Field of Classification Search .................. 709/217, 709/218, 219, 223, 230, 232, 247, 224
See application file for complete search history.

(56) References Cited

U.S. PATENT DOCUMENTS

| 5,450,485 A | 9/1995 | Hamilton |
| 5,532,762 A | 7/1996 | Sakai et al. |
| 2003/0169330 A1 | 9/2003 | Ben-Shachar et al. |
| 2006/0078288 A1* | 4/2006 | Huang et al. ................ 386/52 |
| 2006/0221876 A1* | 10/2006 | Kosanovic et al. ........... 370/286 |
| 2007/0008956 A1 | 1/2007 | Moran et al. |
| 2007/0112563 A1* | 5/2007 | Krantz et al. ................ 704/216 |
| 2007/0116254 A1* | 5/2007 | Looney et al. .......... 379/406.01 |
| 2007/0142055 A1 | 6/2007 | Toivanen et al. |
| 2008/0056503 A1* | 3/2008 | McGrath ........................ 381/17 |

FOREIGN PATENT DOCUMENTS

WO PCTUS0878303 12/2008

* cited by examiner

*Primary Examiner* — Liangche A Wang
(74) *Attorney, Agent, or Firm* — Edward J. Marshall, Attorney at Law P.L.L.C.

(57) ABSTRACT

A method of verifying the transmission of audio content in a media stream may comprise receiving from a server a portion of a media stream having a first audio file format, processing the media stream portion to obtain data values, and determining if any of the data values fall outside of a pre-determined range of data values. A system for verifying the transmission of audio content may comprise a computer connected to a server over a network, and the computer may be adapted to receive from the server a portion of a media stream having a first audio file format, process the media stream portion to obtain a set of data values, determine the highest absolute data value of the set and compare the highest absolute data value to a data value corresponding to audio silence.

55 Claims, 10 Drawing Sheets

Processing audio sample for spectral noise signatures

Stream List - HD radio and internet radio online streaming http://www.domainmusic.com/streamlist/index.htm File Edit View Favorites Tools Help Stream List Browse Channels
All Channels
Active Rock
Adult Alternative (AAA)
Adult Contemporary
Alternative Rock
Americana
American Top 40
Blues
Bluegrass
Christmas
Classical
Classic Rock
Comedy
Country
Dance
Decades
Gay
Hip-Hop
Hit Music
Indie
Jazz
Kids
Love Songs
Mixes
New Music
New Age
News We Play What You Hear
HD Radio, Internet Radio, Wireless Phones, In-Store (channels in alphabetical order)

Album Art

The Christmas Music Channels *Available*
Click here for these Holiday music channels available for your stations use:

The Christmas Hits Channel
 The Christmas Variety Channel
 The Christmas Pop Music Channel
 The Christmas R&B Channel
 The Christmas Country Channel
 The Christmas Standards Channel

— 102

Album Art

Al's Music Mart (CH 710)
A WIDE variety of music from the 60's thru today!

Album Art

The Alternative (CH 702) — 104
Alternative hit rock songs, new releases and other stuff.

Album Art

Americana NewGrass (CH 1004) — 106
Mix of American and Bluegrass from today and yesterday.

Album Art

American Top 40 Classics (Ch510)
Classic programs from the 80's of American Top 40.

Album Art

Amy (CH 108)
Modem AAA. Once rebellious, now adventurous, eclectic and alternative in her style.

© 2007-2008 Clear Channel Management Services, L.P.

Fig. 6

```
                                                                    A
 ┌──────────────────────────────────────────────────────────────────┐
 │ Stream List                                                       │
 │                                                                  ─┼─B
 │ ⊙⊙ ▾ [ http://www.streamlist.aspx                              ] │
 │                                                                  ─┼─C
 │ File Edit View Favorites Tools Help                              │
 │                                                                  ─┼─D
 │ Audio Stream Monitor                                          │
 │    ╱ 82  ╱ 84  ╱ 86                                              │
 │ Login  Logout  Signup                                            │
 │                                                                  ─┼─E
 │  Markets  Servers  Static Streams  Dynamic Streams               │
 │      ╲       ╲          ╲              ╲                         ─┼─F
 │       96     92          90             94                       │
 │ Listing MARKETS                                              │
 │       ╱ 118       ╱ 98                    ╱ 110        ╱ 111     │
 │      Name        Email to               Email from    Silence    │
 │                 jdoe@domain.com,         Top75@domain.com   1    │
 │ Top75 silence   janedoe@domain.com,                              │
 │                 johndoe@domain.com                               │
 │ Top75 connection johnterry@domain.com   Top75@domain.com    0    │
 │ NATIONAL                                 myr@domain.com     1    │
 │ OKLAHOMACITY-OK                          myr@domain.com     1    │
 │ RIVERSIDE-CA                             myr@domain.com     1    │
 │ DALLAS-TX                                myr@domain.com     1    │
 │ BRYAN-TX                                 myr@domain.com     1    │
 │ MUSKEGON-MI                              myr@domain.com     1    │
 │ WINCHESTER-VA                            myr@domain.com     1    │
 │ MCALLEN-TX                               myr@domain.com     1    │
 │ AKRON-OH                                 myr@domain.com     1    │
 │ HARTFORD-CT                              myr@domain.com     1    │
 │ CINCINNATI-OH   jdoe@domain.com          myr@domain.com     1    │
 │                 janedoe@domain.com                               │
 │ SANLUISOBISPO-CA                         myr@domain.com     1    │
 │ SYRACUSE-NY                              myr@domain.com     1    │
 │ TUCSON-AZ                                myr@domain.com     1    │
 │ LOSANGLES-CA                             myr@domain.com     1    │
 │                                                                  ─┼─G
 └──────────────────────────────────────────────────────────────────┘─┼─H
                          Clear Channel Management Services, L.P.    I
```

Fig.7A

SYSTEM AND METHOD FOR MEDIA STREAM MONITORING

CROSS-REFERENCE TO RELATED APPLICATIONS

This application claims priority to U.S. Provisional Application No. 61/029,541 filed Feb. 18, 2008, the disclosure of which is incorporated herein by reference.

COPYRIGHT NOTICE

This application contains material that is subject to copyright protection. Such material may be reproduced by any person exactly as it appears in the Patent and Trademark Office patent files or records. The copyright owner otherwise reserves all rights to such material.

FIELD

This application generally relates to information technology in the field of Internet broadcasting, and more particularly to media stream monitoring.

BACKGROUND

In the field of Internet broadcasting, it is often difficult for broadcasters to readily determine if a network connection is established, or, if connected, whether media content is actually being streamed. Typically, a user, such as a broadcaster, may attempt to connect to a streaming server's port and listen for a media stream to determine streaming media existence and quality. There exists a need for a more efficient system and method for media stream monitoring and analysis.

SUMMARY

A method of verifying the transmission of audio content in a media stream may comprise receiving from a server a portion of a media stream having a first audio file format, processing the media stream portion to obtain data values, and determining if any of the data values fall outside of a predetermined range of data values. A system for verifying the transmission of audio content may comprise a computer connected to a server over a network, and the computer may be adapted to receive from the server a portion of a media stream having a first audio file format, process the media stream portion to obtain a set of data values, determine the highest absolute data value of the set and compare the highest absolute data value to a data value corresponding to audio silence.

BRIEF DESCRIPTION OF THE DRAWINGS

FIG. 6 is one embodiment of a screen shot of an interface providing access to a plurality of media streams.

FIGS. 7A and 7B depict one embodiment of a screen shot of a user interface.

DETAILED DESCRIPTION

Figure 1:
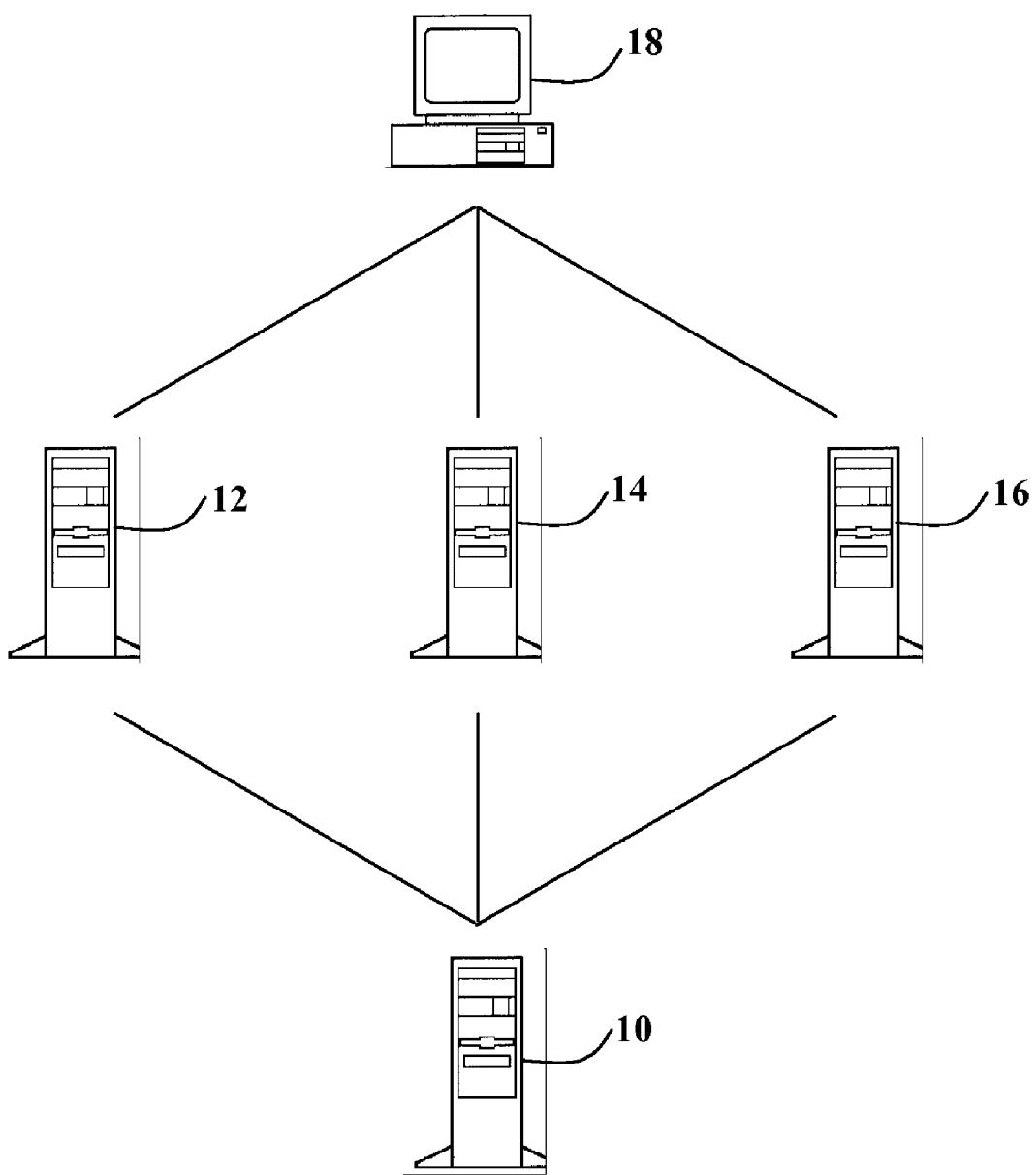
FIG. 1 depicts an embodiment of a system that may be used for media stream monitoring.

A system and method for monitoring and analyzing one or more media streams is described. As shown in FIG. 1, a monitoring server 10 may be provided to monitor and analyze one or more streaming servers for media streams. In the embodiment of FIG. 1, streaming servers 12, 14, and 16 may each provide one or more media streams. In one embodiment, the media streams may be Internet-based music streams, such as those provided by Internet radio stations. Those skilled in the art will recognize that the media streams may comprise audio, video, data or text, or various combinations thereof. A user may use a user computer 18 or other device (such as a laptop, cell phone, PDA or portable electronic device) to access the media streams transmitted by streaming servers 12, 14, and 16. Those skilled in the art will also recognize that the system and method may be used with networks other than the Internet, and that the server arrangement of FIG. 1 is exemplary. Those skilled in the art will further recognize that Web servers or other suitable streaming media computers may be used, as well, and that a PC may just as easily be used in place of a monitoring server 10.

Referring to the embodiment of FIG. 1 and FIG. 6, an interface 100 may be displayed on user computer 18 to provide the user with access a plurality of media streams, through links to the URL of the media stream. In the embodiment of FIG. 6, the user interface 100 may include a web page that provides links to various media streams. For example and not by way of limitation, streaming server 12 may provide an Internet-based music stream, named Al's Music Mart, that comprises a variety of music from the 80s to today. The user interface 100 may provide a link 102 to the Al's Music Mart stream. A user may click on the Al's Music Mart link 102 in order to connect the user's computer 18 to streaming server 12. Similarly, an Alternative link 104 may be provided to allow the user to connect the user's computer 18 to streaming server 14 in order to receive and listen to an alt-rock music stream. Other links may be provided for access other media streams, such as an Americana NewGrass link 106 that may connect computer 18 to streaming server 16.

A broadcaster of media streams, such as a radio station broadcasting via the Internet, may also access the media streams that it broadcasts in the same way that the users may. For example, the broadcaster of the Al's Music Mart stream may access streaming server 12 as would a user. As is known, the broadcaster may thereby verify that streaming server 12 is actually streaming content, and that the streamed content has the expected quality. As noted above, however, that method of monitoring and analyzing media streams is inefficient, particularly if the broadcaster provides multiple media streams from multiple streaming servers. In contrast, the system and method described herein may allow a broadcaster to self-monitor and analyze its own media streams much more efficiently.

Figure 2:
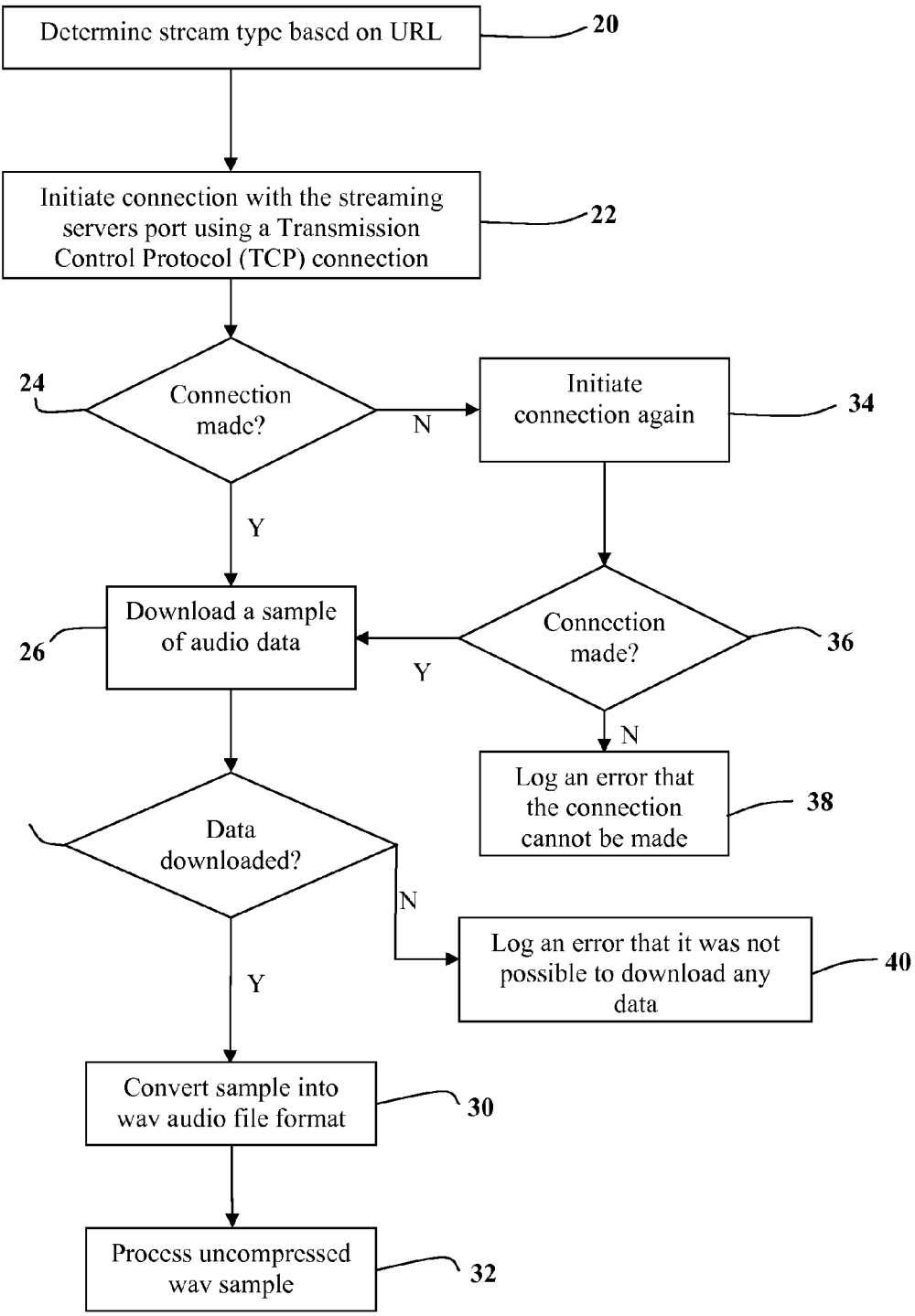
FIG. 2 is a flow chart of one embodiment of a method for media stream monitoring.

Referring to FIGS. 1-2, one embodiment of a method of media stream monitoring may include determining the media stream type based on the URL of the media stream as indicated at 20. That may be accomplished, for example, by determining from the streaming server the MIME type of the media stream. Alternatively, the media stream type may be determined by issuing a request to the streaming server asking for "content type" HTTP headers. A stream type may include but is not limited to Microsoft's Media Services (MMS) and Real Time Streaming Protocol (RTSP). A monitoring server 10 may initiate a connection with one of streaming servers 12, 14 or 16 ports using a Transmission Control Protocol (TCP) connection as indicated at 22. Those skilled in the art will recognize that other protocols, such as User Datagram Protocol (UDP), may also be used. If a connection is not made with a streaming server (decision box 24), a connection may be initiated again as indicated at 34. If a connection is still not made (decision box 36), an error message may be logged that the connection cannot be made as indicated at 38. If a connection is made (decision box 24 or 36), the monitoring server 10 may attempt to receive or download one or more samples or portions of a media stream (such as music audio content) as indicated at 26. For example, the monitoring server may receive a two-second portion of the media stream. If no data can be received (decision box 28), an error message may be logged that it was not possible to download any data as indicated at 40. If a sample of the media stream is received (decision box 28), the samples may be converted to a preferred file format, including but not limited to WAV file format as indicated at 30. Those skilled in the art will recognize that the file format may be uncompressed, lossless, lossy or otherwise suitable for processing. The WAV samples may be processed as indicated at 32.

Figure 3:
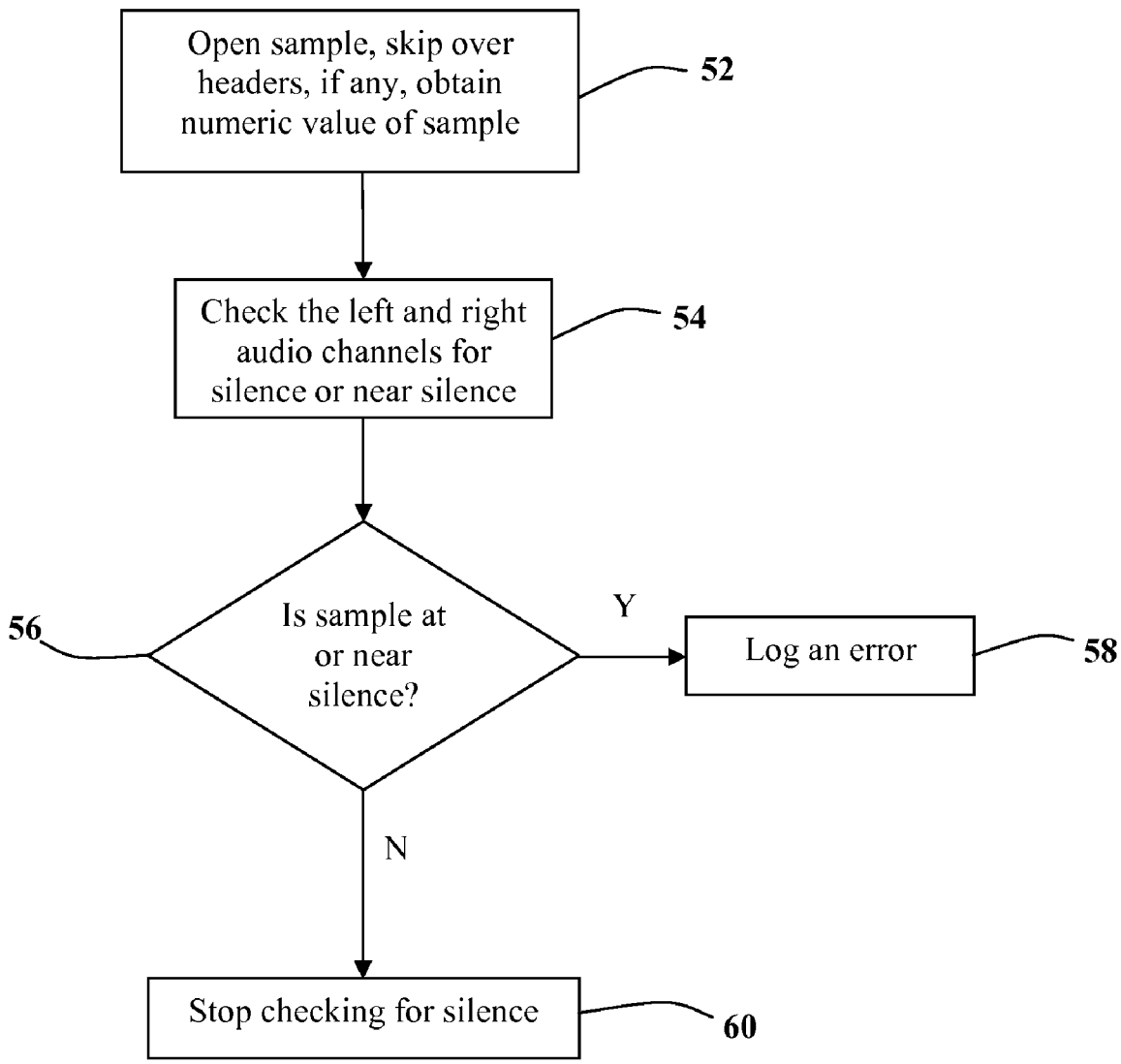
FIG. 3 is a flow chart of one embodiment of a method for processing an audio sample for silence.

Referring now to FIG. 3, the media sample (in this example, an audio sample) may be processed to determine if it is silent or near silent. The sample may be opened and a numeric data value may be obtained for the samples after skipping over any headers as indicated at 52. The data values may represent volume level, for example, or indicate the presence (or lack thereof) of video or other content. For media streams that include audio, the left and right audio channels may be checked for silence or near silence, as defined to be a numeric data value above a set threshold or outside a selected range, as indicated at 54. If the samples are found to be at or near silence (decision box 56), an error message may be logged as indicated at 58. If the sample is found to not be silent or near silent (decision box 56), checking for silence may be stopped as indicated at 60. In one embodiment, the media stream may be processed to obtain Pulse Code Modulation (PCM) data values. Such values may, for audio samples, may indicate volume. For example, the range for silence may be designated as a PCM data value range of −50 to 50, where complete silence is a value of 0. If PCM data values of the processed media stream sample fall outside that range, that may serve as an indication that the media stream actually contains media content. Those skilled in the art will recognize that other ranges may be selected above the data value for complete silence or a value for complete silence may be selected.

In one example, if an Internet radio station makes a streaming connection with a server, but the media stream packets contain no audio or other intended content, monitoring server obtains a sample of the media stream and processes it to obtain PCM data values that indicate audio volume. If the PCM values are at or near silence (i.e., at or near a PCM data value of 0), or otherwise fall within a designated range for silence (e.g., between −50 and 50), the monitoring server may be able to detect if the media stream sample (and inferentially the rest of the media stream) contains audio content. If no audio content is detected (e.g., the PCM data values are within the designated range for silence), then the monitoring server may send an alert or notification, such as an email, to the Internet radio station operator.

Figure 4:
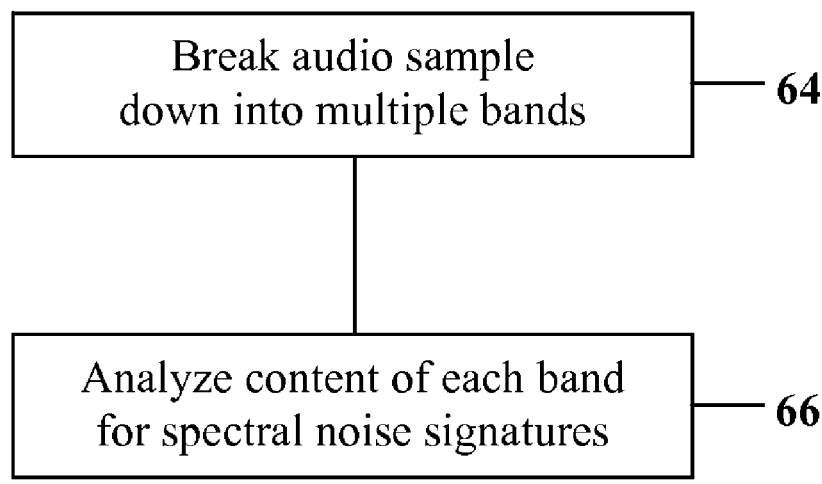
FIG. 4 is a flow chart of one embodiment of a method for processing an audio sample for spectral noise signatures in an embodiment of the present invention.

Referring to FIG. 4, a sample may be analyzed for spectral noise signatures. In one embodiment, the sample may be broken down into multiple bands as indicated at 64. The content of each band may be analyzed for spectral noise signatures as indicated at 66. For example, PCM values could be used to detect certain tones. Those skilled in the art will recognize that PCM or other data values may pertain to the frequency and/or amplitude of audio or other content.

In another embodiment, a video sample may be processed to check if Artist and Title data at least partially matches. In addition, a video or audio sample, or a combination thereof, may be processed to determine if copyright warning information or a particular watermark is attached. In some embodiments, a video sample may be broken down into component video to analyze whether a live video signature, a blank screen, or all noise is present. Those skilled in the art will recognize that PCM values may be used for that purpose. A component video may be captured and saved for later human review of the component video if, for example, a blank screen or all noise was determined to be present.

Figure 5A:
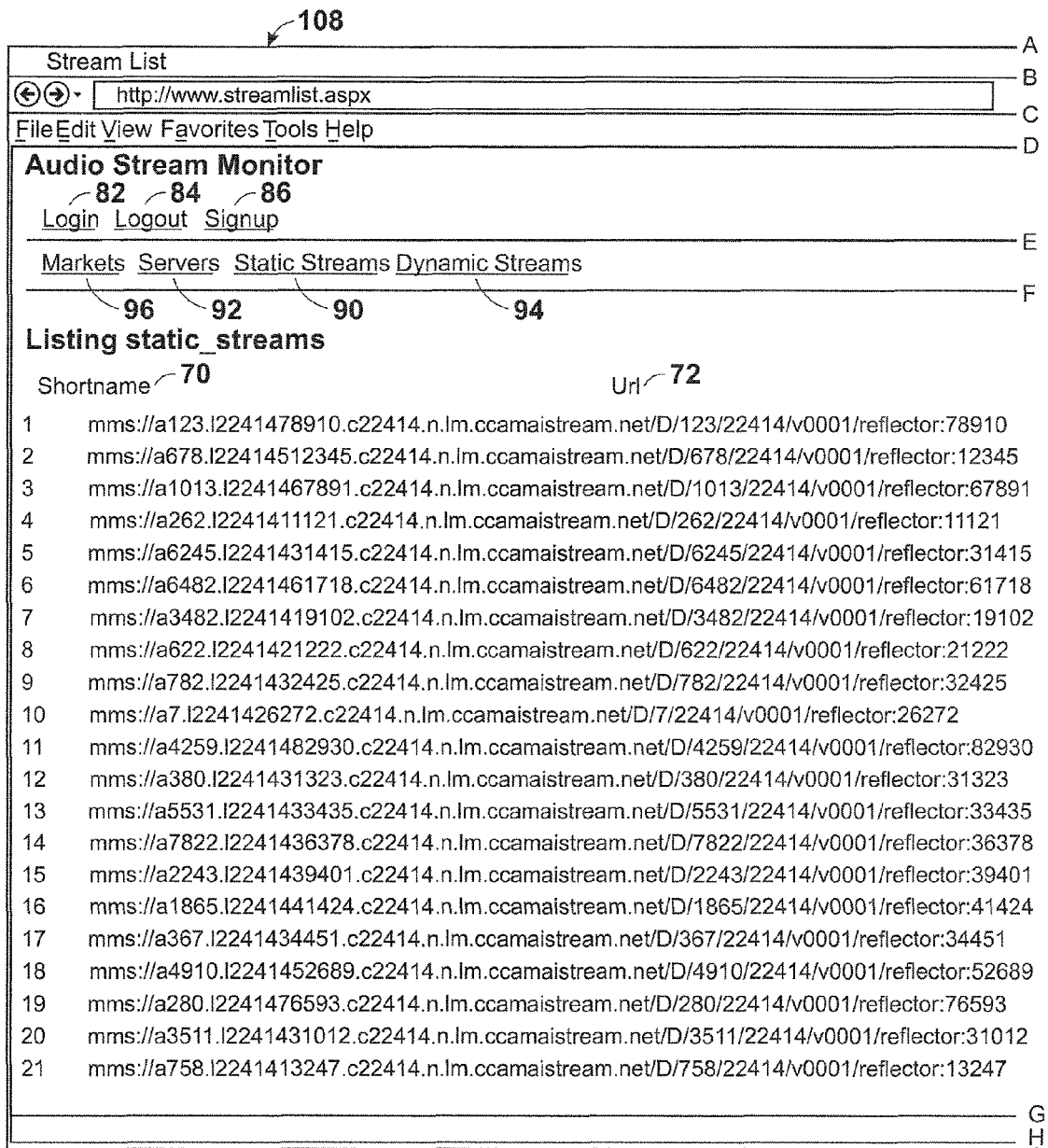
FIGS. 5A and 5B depict one embodiment of a screen shot of a user interface.
Figure 5B:
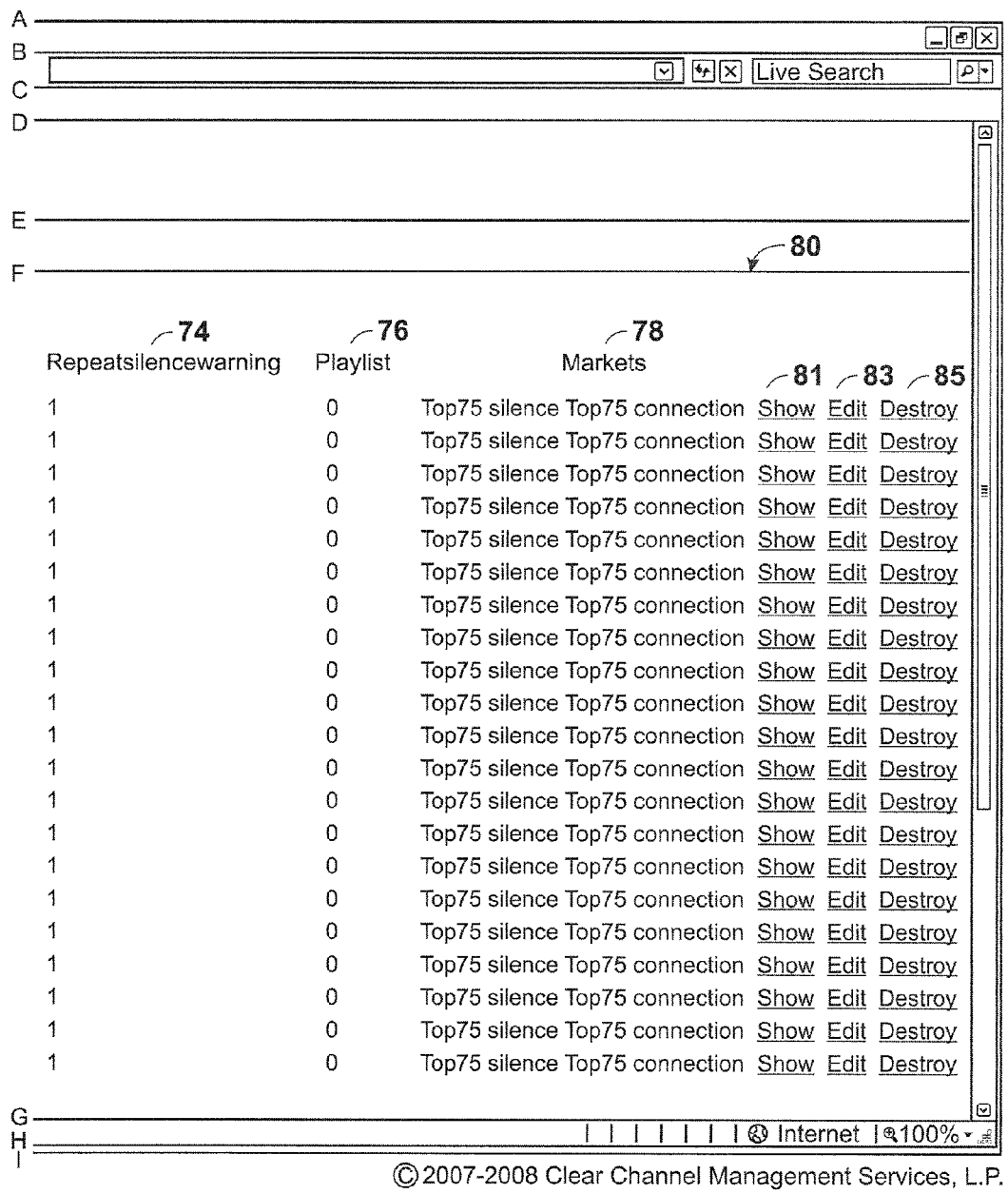

Referring now to FIGS. 5A and 5B, in some embodiments, a user interface 108 may be provided to manage a plurality of media streams being monitored using the system and method described herein. Those skilled in the art will recognize that a server may provide more than one media stream, and that various media streams may pertain to various radio markets. Radio markets may be categorized by demographics, location, interests, and the like. In one embodiment, the user interface may be web-based and may be used to assign streaming to users and keep track of errors, such as errors in connecting to the stream or silence-related errors. When Static Streams button 90 is selected, a listing of all static streams (i.e., streams from a static IP address) being monitored may appear in user interface 108. A Shortname column 70 may provide an abbreviated name for each media stream. A URL column 72 may provide the URL for each media stream. A repeatsilencewarning column 74 may provide either a 1 (true) or a 0 (false), where a 1 means that an email or other type of notification will be sent to a user every time the system detects silence, and a 0 means an email or other type of notification will be sent to a user only the first time the system detects silence. A Markets column 78 may provide one or more user names and email addresses for users in a market that are assigned to the stream, for the system to use for sending notifications. Such users may be, for example, the radio station from which the stream originates, and/or the radio stations in markets served by the stream. An options column 80 may provide a Show button 81 for showing the users and email addresses and what markets each stream is in. An Edit button 83 may be provided for editing that user information, and a Destroy button 85 may be provided for removing the stream information. Of course, other functions may be provided in an options column 80. A similar display may be provided when a user selects the Dynamic Streams button 94.

Figure 8:
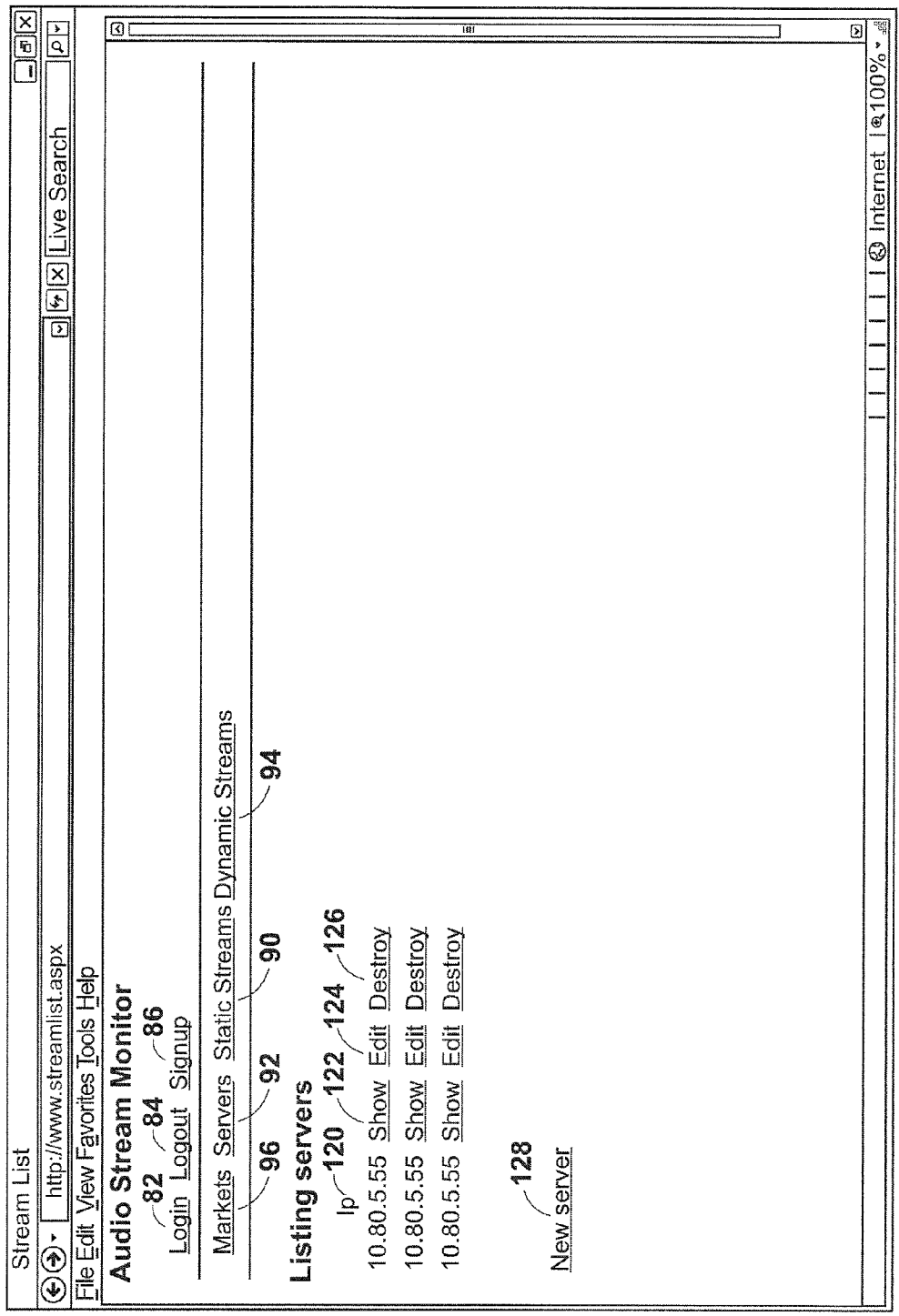
FIG. 8 is one embodiment of a screen shot of a user interface.

When the Server button 92 is selected, a screen such as that shown in FIG. 8 may appear with a listing of one or more streaming servers. A streaming server may be identified by its IP address in IP column 120, while a new streaming server may be added by clicking the New Server button 128. Information about a particular streaming server may be displayed by clicking the Show button 122, edited with the Edit button 124, or deleted from the system with the Destroy button 126.

Figure 7B:
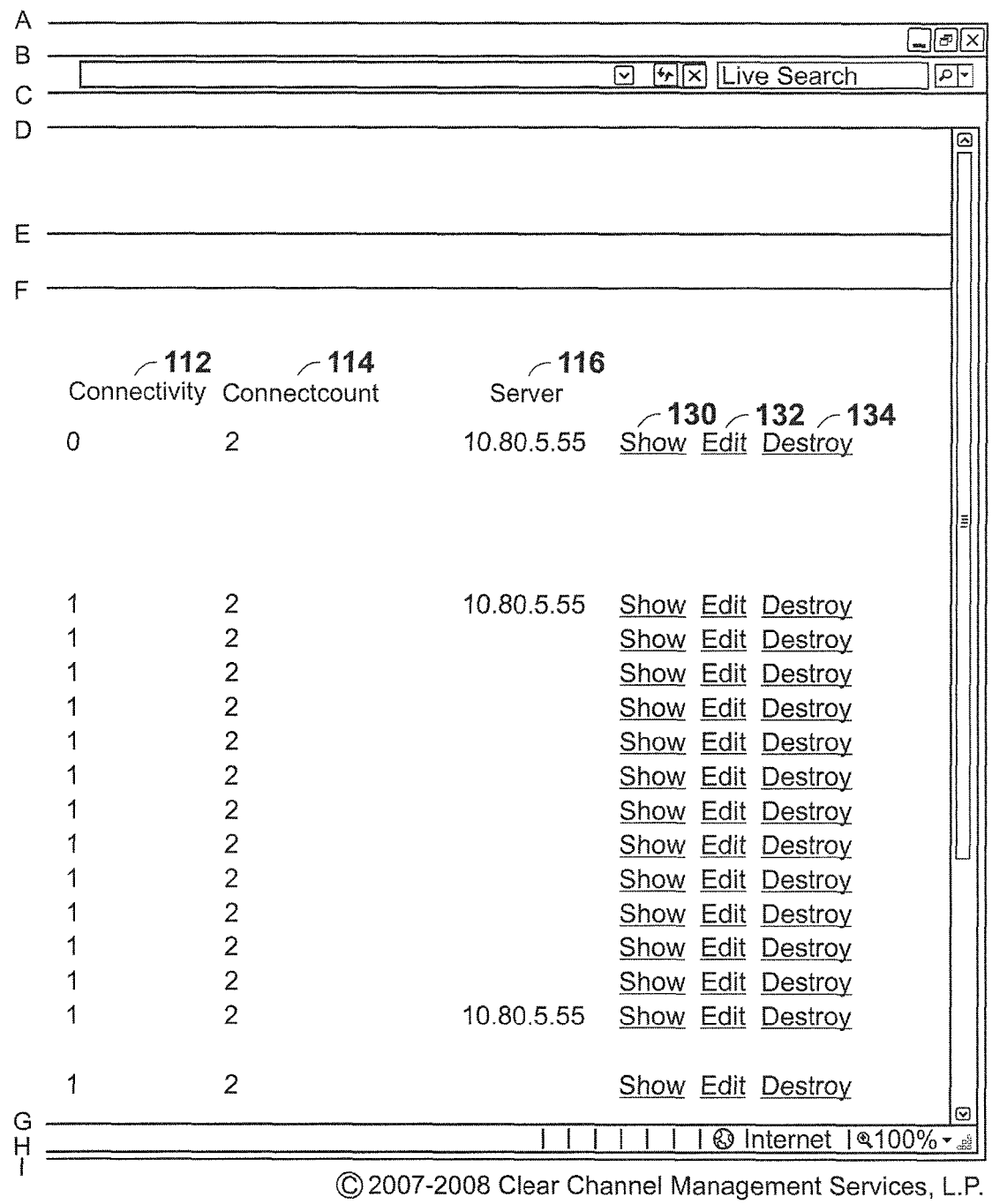

Referring now to FIG. 5A, FIG. 5B, FIG. 7A, FIG. 7B, and FIG. 8, when the Markets button 96 is selected, the screen shown in FIGS. 7A and 7B may appear listing all users utilizing the system. The name of a user may appear in the Name column 118, one or more email addresses assigned to the user may appear in the Email To column 98, while the email address where notifications from the system originate may be provided in the Email From column 110. A Silence column 111 may have a 1 to set the system to check for silence, and have a 0 to set the system to not check for silence. A Connectivity column 112 may provide a 1 to set the system to check for connectivity and a 0 if the system is not set to check for connectivity. A Connectcount column 114 may provide the number of connectivity errors that need to occur before a notification is sent to a user. A Server column 116 may provide one or more streaming servers assigned to a user. A Show button 130 may display details of a user, an Edit button 132 may allow a user's information to be edited, while a Destroy button 134 may allow a user to be deleted from the system. When the Login button 82 is selected, a user may login to interface 108 to access and edit the information contained therein. When the Logout button 84 is selected, a user may log out of interface 108. When the Signup button 84 is selected, a new user may sign up to have access to the user interface. As noted above, when the Dynamic Streams button 94 is selected, a screen (not shown) may appear listing all dynamic streams being monitored, i.e. streams whose URLs are subject to change. Dynamic URLs may be used to prevent listeners from directly linking to a URL and force them to use a particular media player in order to listen (or view, or otherwise access, as the case may be) to the stream.

Although the foregoing specific details describe certain embodiments of this invention, persons having ordinary skill in the art will recognize that various changes may be made in the details of this invention without departing from the spirit and scope of the invention as defined in the appended claims. Therefore, it should be understood that this invention is not to be limited to the specific details shown and described herein.

What is claimed is:

1. A method of verifying transmission of audio content by an Internet radio station, the method comprising:
    connecting a monitoring server to an output of a media stream server, the media stream server having an established streaming session with a media player, wherein the output of the media stream server provides a media stream including at least one header and at least one content portion, to the media player;
    sampling the at least one content portion of the media stream, using the monitoring server, to obtain Pulse Code Modulation (PCM) data values for audio volume;
    determining whether the media stream server is streaming audio content in the at least one content portion of the media stream by comparing, at the monitoring server, the PCM data values to a predetermined threshold value; and
    if the PCM data values indicate that the media stream server is not streaming audio content in the at least one content portion of the media stream, sending a notification from the monitoring server to the media stream server.

2. The method of claim 1, further comprising converting the media stream portion from a first audio file format to a second audio file format prior to processing.

3. The method of claim 2, wherein the second audio file format is an uncompressed file format.

4. The method of claim 3, wherein the second audio file format is a WAV file format.

5. The method of claim 1, wherein the media stream portion further comprises a left audio channel file and a right audio channel file;
    the method further comprising separately analyzing the left and right audio channels to obtain data values indicating audio volume and determining whether any of the data values exceed the predetermined threshold value.

6. A method of verifying the transmission of audio content in a media stream, the method comprising:
    connecting a monitoring server to an output of a media stream server, the media stream server having an established streaming session with a media player, wherein the output of the media stream server provides a media stream including at least one header and at least one content portion, to the media player;
    sampling from a server at least one content portion of a media stream, using a monitoring server, to obtain Pulse Code Modulation (PCM) data values;
    determining whether the server is streaming audio content in the at least one content portion of the media stream by comparing, at the monitoring server, the PCM data values to a predetermined range of PCM data values indicating a predetermined threshold; and
    if the PCM data values indicate that the media stream server is not streaming audio content in the at least one content portion of the media stream, sending a notification from the monitoring server to the media stream server.

7. The method of claim 6, further comprising converting the media stream portion from a first audio file format to a second audio file format prior to processing.

8. The method of claim 7, wherein the second audio file format is an uncompressed file format.

9. The method of claim 6, wherein the PCM data values range from −50 to 50.

10. The method of claim 9, wherein a PCM data value of zero indicates that the server is not streaming audio content in the at least one content portion of the media stream.

11. The method of claim 6, further comprising sending a notification if none of the data values fall outside of the predetermined range of data values.

12. The method of claim 11, wherein the notification comprises an email to a user.

13. The method of claim 6, wherein the server comprises a Web server.

14. The method of claim 6, wherein the server comprises a streaming server.

15. The method of claim 6, wherein the media stream portion further comprises a left audio channel file and a right audio channel file; the method further comprising separately analyzing the left and right audio channels to obtain data values indicating audio volume and determining whether any of the data values exceed the predetermined threshold.

16. A method of verifying the transmission of audio content, the method comprising:
    connecting a monitoring server to an output of a media stream server, the media stream server having an established streaming session with a media player, wherein the output of the media stream server provides a media stream including at least one header and at least one content portion, to the media player;
    sampling at least one content portion of a media stream, using a monitoring server, to obtain a set of Pulse Code Modulation (PCM) data values;
    determining the highest absolute PCM data value of the set;
    comparing the highest absolute PCM data value to a PCM data value corresponding to a predetermined audio silence threshold, wherein the threshold indicates that a media stream server is not streaming audio content in the at least one content portion of the media stream; and
    if the highest PCM data value does not exceed the PCM data value corresponding to a predetermined audio silence threshold, sending a notification from the monitoring server to the media stream server.

17. The method of claim 16, wherein the data value corresponding to audio silence is zero.

18. The method of claim 16, wherein the data value corresponding to audio silence comprises a silence threshold.

19. The method of claim 18, wherein the silence threshold comprises an absolute value of 50.

20. A system for verifying transmission of audio content by an Internet radio station, the system comprising:
   a monitoring server connected to an output of a media stream server, the media stream server having an established streaming session with a media player, wherein the output of the media stream server provides a media stream including at least one header and at least one content portion, to the media player; said monitoring server adapted to:
   sample the at least one content portion of the media stream, using the monitoring server, to obtain Pulse Code Modulation (PCM) data values for audio volume;
   determine whether the media stream server is streaming audio content in the at least one content portion of the media stream by comparing, at the monitoring server, the PCM data values to a predetermined audio silence threshold value; and
   if the PCM data values indicate that the media stream server is not streaming audio content in the at least one content portion of the media stream, send a notification from the monitoring server to the media stream server indicating that audio content is not being streamed.

21. The system of claim 20, wherein the monitoring server is further adapted to convert the media stream portion from a first audio file format to a second audio file format prior to processing.

22. The system of claim 21, wherein the second audio file format is an uncompressed file format.

23. The system of claim 22, wherein the second audio file format is a WAV file format.

24. The system of claim 20, wherein the media stream portion further comprises a left audio channel file and a right audio channel file; and the monitoring server is further adapted to separately analyze the left and right audio channels to obtain data values indicating audio volume and determining whether any of the data values exceed the silence threshold.

25. A system for verifying the transmission of audio content in a media stream, the system comprising:
   a monitoring server connected to an output of a media stream server, the media stream server having an established streaming session with a media player, wherein the output of the media stream server provides a media stream including at least one header and at least one content portion, to the media player; said monitoring server adapted to:
   sample the at least one content portion of the media stream that is output from the server, using the monitoring server, to obtain Pulse Code Modulation (PCM) data values for audio volume; and
   determine if any of the PCM data values fall outside of a pre-determined range of PCM data values that denote a predetermined audio silence threshold, wherein the silence threshold indicates that the server is not streaming audio content in the at least one content portion of the media stream; and
   if the PCM data values indicate that the media stream server is not streaming audio content in the at least one content portion of the media stream, send a notification from the monitoring server to the media stream server indicating that audio content is not being streamed.

26. The system of claim 25, wherein the monitoring server is further adapted to convert the media stream portion from a first audio file format to a second audio file format prior to processing.

27. The system of claim 26, wherein the second audio file format is an uncompressed file format.

28. The system of claim 25, wherein the PCM data values range from −50 to 50.

29. The system of claim 28, wherein a PCM data value of zero denotes an audio silence threshold.

30. The system of claim 25, wherein the notification comprises an email to a user.

31. The system of claim 25, wherein the server comprises a Web server.

32. The system of claim 25, wherein the server comprises a streaming server.

33. The system of claim 25, wherein the media stream portion further comprises a left audio channel file and a right audio channel file; and the computer is further adapted to separately analyze the left and right audio channels to obtain data values for audio volume and determine whether any of the data values exceed a silence threshold indicating that the server is not streaming audio content.

34. A system for verifying the transmission of audio content, the system comprising:
   a monitoring server connected to an output of a media stream server over a network, the media stream server having an established streaming session with a media player, wherein the output of the media stream server provides a media stream including at least one header and at least one content portion, to the media player; said monitoring server adapted to:
   sample the at least one content portion of the media stream, using the monitoring server, to obtain a set of Pulse Code Modulation (PCM) data values;
   determine the highest absolute PCM data value of the set;
   compare the highest absolute PCM data value to a PCM data value corresponding to an indication that the media stream server is not streaming audio content in the at least one content portion of the media stream; and
   if the highest PCM data value indicates that the media stream server is not streaming audio content in the at least one content portion of the media stream, send a notification from the monitoring server to the media stream server indicating that audio content is not being streamed.

35. The system of claim 34, wherein the data value corresponding to an indication that the media stream server is not streaming audio content is zero.

36. The system of claim 34, wherein the data value corresponding to an indication that the media stream server is not streaming audio content comprises a silence threshold.

37. The system of claim 36, wherein the silence threshold comprises an absolute value of 50.

38. A system for verifying the transmission of media content in a media stream, the system comprising:
   a monitoring server connected to a media streaming server over a network, the media stream server having an established streaming session with a media player, wherein the output of the media stream server provides a media stream including at least one header and at least one content portion, to the media player; said monitoring server adapted to:

sample the at least one content portion of the media stream, using the monitoring server, to obtain Pulse Code Modulation (PCM) data values;

determine if any of the PCM data values fall outside of a pre-determined range of PCM data values denoting an audio silence threshold, wherein the silence threshold indicates that the media stream server is not streaming audio content in the at least one content portion of the media stream; and in response to at least one PCM data value falling outside of the pre-determined range of PCM data values denoting an audio silence threshold, sending a notification from the monitoring server to the media stream server indicating that audio content is not being streamed.

39. A computer adapted to:

receive a portion of an output of a media stream server, the media stream server having an established streaming session with a media player, wherein the output of the media stream server provides a media stream having a first audio file format, the media stream portion comprising one or more headers;

process a portion of the media stream, other than the one or more headers, to obtain Pulse Code Modulation (PCM) data values for audio volume;

determine whether the media stream is still being broadcast by identifying any of the PCM data values exceeding a silence threshold, wherein an absence of a PCM data value exceeding the silence threshold indicates that the media stream is not being broadcast; and if none of the PCM data values exceeds the silence threshold, send a notification to the media stream server.

40. The computer of claim 39, wherein the computer is further adapted to convert the media stream portion to a second audio file format prior to processing.

41. The computer of claim 40, wherein the second audio file format is an uncompressed file format.

42. The computer of claim 41, wherein the second audio file format is a W A V file format.

43. The computer of claim 39, wherein the media stream portion further comprises a left audio channel file and a right audio channel file; and the computer is further adapted to separately analyze the left and right audio channels to obtain data values indicating audio volume and determining whether any of the data values exceed the silence threshold.

44. A computer adapted to:

receive a portion of an output of a media stream server, the media stream server having an established streaming session with a media player, wherein the output of the media stream server provides a media stream having a first audio file format;

process a portion of the media stream to obtain Pulse Code Modulation (PCM) data values;

determine if any of the PCM data values fall outside of a pre-determined range of PCM data values that denote an audio silence threshold, wherein the silence threshold represents an absence of a transmission of audio content; and in response to determining that at least one PCM data value falling outside the pre-determined range of PCM data values that denote a silence threshold, send a notification to the media stream server.

45. The computer of claim 44, wherein the computer is further adapted to convert the media stream portion to a second audio file format prior to processing.

46. The computer of claim 45, wherein the second audio file format is an uncompressed file format.

47. The computer of claim 44, wherein the PCM data values range from −50 to 50.

48. The computer of claim 47, wherein a PCM data value of zero denotes audio silence.

49. The computer of claim 44, wherein the notification comprises an email to a user.

50. The computer of claim 44, wherein the media stream portion further comprises a left audio channel file and a right audio channel file; and the computer is further adapted to separately analyze the left and right audio channels to obtain data values indicating audio volume and determining whether any of the data values exceed the silence threshold.

51. A computer adapted to:

receive a portion of an output of a media stream server, the media stream server having an established streaming session with a media player, wherein the output of the media stream server provides a media stream having a first audio file format;

process a portion of the media stream to obtain a set of Pulse Code Modulation (PCM) data values;

determine the highest absolute PCM data value of the set;

compare the highest absolute PCM data value to a PCM data value corresponding to an audio silence threshold, wherein the silence threshold represents an absence of a transmission of audio content; and in response to the comparison indicating audio silence, send a notification to the media stream server.

52. The computer of claim 51, wherein the data value corresponding to audio silence is zero.

53. The computer of claim 51, wherein the data value corresponding to audio silence comprises a silence threshold.

54. The computer of claim 53, wherein the silence threshold comprises an absolute value of 50.

55. A computer adapted to:

receive a portion of an output of a media stream server, the media stream server having an established streaming session with a media player, wherein the output of the media stream server provides a media stream having a first media file format;

process a portion of the media stream to obtain Pulse Code Modulation (PCM) data values;

determine if any of the PCM data values fall outside of a pre-determined range of PCM data values that denote an audio silence threshold, wherein the silence threshold represents an absence of a transmission of audio content; and in response to determining that at least one PCM data value falls outside the pre-determined range of PCM data values that denote a silence threshold, send a notification to the media stream server.

* * * * *